US011902142B2

(12) United States Patent
Mei et al.

(10) Patent No.: US 11,902,142 B2
(45) Date of Patent: Feb. 13, 2024

(54) IOT PANEL FOR DIAGNOSTICS AND MONITORING OF LAN CABLE CONDUCTORS

(71) Applicant: NFLEXON, LLC, Allen, TX (US)

(72) Inventors: Richard Y. Mei, Parker, TX (US); George W. Brooks, Allen, TX (US)

(73) Assignee: NFLEXON, LLC, Allen, TX (US)

( * ) Notice: Subject to any disclaimer, the term of this patent is extended or adjusted under 35 U.S.C. 154(b) by 0 days.

(21) Appl. No.: 17/103,890

(22) Filed: Nov. 24, 2020

(65) Prior Publication Data

US 2022/0255832 A1 Aug. 11, 2022

Related U.S. Application Data

(63) and a continuation-in-part of application No. 16/161,293, filed on Oct. 16, 2018, now Pat. No. 10,848,404.

(60) Provisional application No. 62/944,155, filed on Dec. 5, 2019.

(51) Int. Cl.
*H04L 43/50* (2022.01)
*H04L 43/0894* (2022.01)

(52) U.S. Cl.
CPC .......... *H04L 43/50* (2013.01); *H04L 43/0894* (2013.01)

(58) Field of Classification Search
CPC ............................ H04L 43/50; H04L 43/0894
USPC .......................................................... 709/224
See application file for complete search history.

(56) References Cited

U.S. PATENT DOCUMENTS

| | | | | |
|---|---|---|---|---|
| 5,420,512 A | * | 5/1995 | Spillane | G01R 31/58 324/66 |
| 7,221,284 B2 | * | 5/2007 | Scherer | G01R 31/69 340/815.45 |
| 7,706,369 B2 | * | 4/2010 | Roese | H04L 67/52 370/392 |
| 2003/0216144 A1 | * | 11/2003 | Roese | H04L 63/0492 455/456.2 |

* cited by examiner

*Primary Examiner* — Zi Ye

(57) ABSTRACT

A LAN cable conductor validation system includes controllable relays in-line with a portion of the twisted pair wires of the Ethernet cables. By temporarily open circuiting some of the Ethernet cable twisted pairs a drop in transmission speed can be detected for an active network component. This allows the active component's MAC address to be verified at a given physical location within the cable conductor network system.

15 Claims, 12 Drawing Sheets

IOT PANEL FOR DIAGNOSTICS AND MONITORING OF LAN CABLE CONDUCTORS

CROSS-REFERENCE TO RELATED APPLICATIONS

The present application claims priority from and incorporates by reference in its entirety U.S. utility patent application Ser. No. 16/161,293 filed Oct. 16, 2018, and also claims priority from and incorporates by reference in its entirety U.S. provisional patent application 62/944,155 filed Dec. 5, 2020.

BACKGROUND

Field of the Invention

The present invention relates to telecommunications diagnostic and monitoring equipment, and more particularly, to apparatus and methods for measuring and detecting local area network (LAN) cable conductors.

Description of Related Art

It is quite common for businesses or other organizations to have a wired network installed in their building or on their property to provide Internet access and link their wireless nodes, computers and sometimes even their printers. The network—for example, a LAN (local area network)—may entail a single server in a wiring closet or multiple server units in a server rack. The server(s) typically have a number of signal cables running from them that are routed throughout the premises. Historically, network cabling installers followed installation practices whereby they bundled a large number of cables together for ease of installation in running the cables above the ceiling (in the plenum).

Before the advent of Power over Ethernet (PoE) applications the number of cables per bundle wasn't a concern. The network cables were primarily used to transmit data which didn't require significant amounts of current. This changed with the advent of PoE applications and desire to power networked devices using the network cable. It is especially a concern for 4-Pair Power over Ethernet (4PPoE) applications. The number of cables per bundle became a concern because supplying power to cable raises the temperature of the cable. High cable temperature degrades the electrical performance of the cabling system. If it persists for a long period of time, the integrity of the cable may be irreversibly impacted. Moreover, when a problem with the network arises it can be difficult for a technician to arrive at the solution without some sort of data other than a complaint that the system has failed in a particular area.

SUMMARY

The present inventor recognized certain limitations in conventional diagnostic systems for PoE networks. Embodiments disclosed herein address the above stated needs by providing systems and methods for measuring and monitoring LAN cable conductors.

Various embodiments are drawn to a cable conductor monitoring system that includes an IoT device with a number of IoT input ports. The IoT device may be embodied as either an IoT panel or an IoT outlet. Each of the IoT input ports is connected to a network switch output port. The IoT panel includes a corresponding number of IoT output ports each connected to cable conductors of the network switch. The IoT panel is configured to make a current measurement on each of the signals from each of the network switch output ports. An Iot device embodied as an Iot outlet is also connected to a cable conductor from a network port.

Various embodiments include a number of temperature sensors distributed at different points along the cable conductors connected to either the IoT panel or an IoT outlet. The temperature sensors are configured to make local temperature readings on the cable conductors or the ambient environment where the cable conductors are installed. In the event the temperature readings or current readings for a given network switch output port exceed predefined limits, the IoT panel is configured to block certain port turn up requests from the network switch to increase of PoE power level for selected cable conductor(s), or in some instances, reduce the PoE levels of current on selected cable conductor(s). The cable conductor(s) selected to be subject to current limiting constraints may be based on a predetermined prioritization of the cable conductors.

Various embodiments also include a number of IoT outlets that are connected to the traditional patch panel or network switch via the cable conductors. The IoT outlets may be configured to make a current measurement on each cable conductor terminated with them or connected to them. An IoT outlet can block a corresponding port turn up request from the network switch to increase its PoE power level. The system includes a gateway connected to the IoT panel, the IoT outlet and the temperature sensor. The gateway provides Internet access to the various components of the system.

BRIEF DESCRIPTION OF THE DRAWINGS

The accompanying drawings, which are incorporated in and constitute part of the specification, illustrate various embodiments of the invention. Together with the general description, the following drawings serve to explain the principles of the invention.

DETAILED DESCRIPTION

Figure 1:
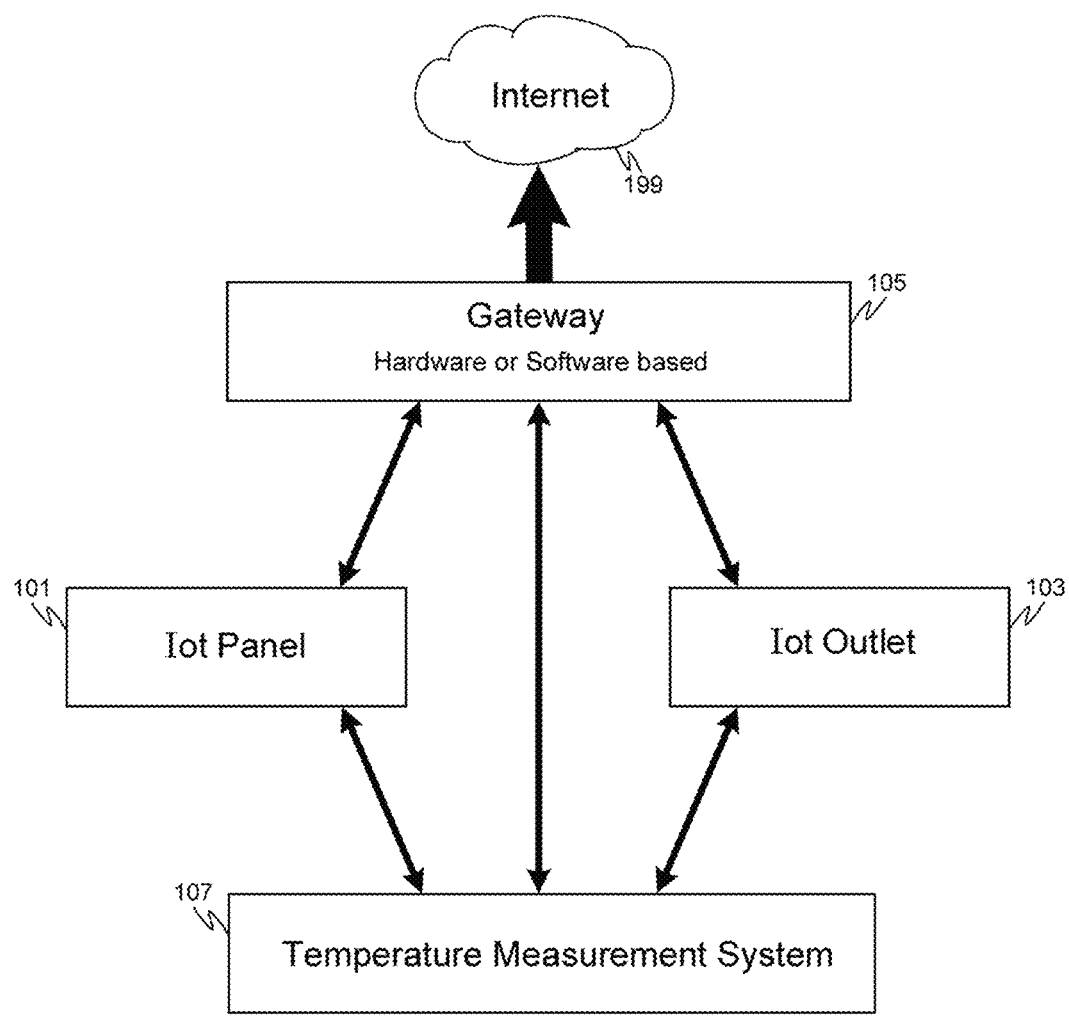
FIG. 1 is a block diagram of system components according to various embodiments.

FIG. 1 is a block diagram of embodiment 100 of a cable network system, e.g., a LAN cable monitoring system. The system is typically implemented in component parts using various numbers of four different component categories. The four categories of components include IoT panels 101, IoT outlets 103, gateways 105 and a temperature measurement system 107. The various component devices may either be configured to work independently or operate in conjunction with each other. The system typically has a number of active component devices connected to is such as computers, printers, scanners, telephones, or the like.

The IoT panel 101 is typically inserted in-line on the signal lines coming out of a network switch. IoT panel 101 receives communication signals from the network switch, monitors or measures the signals, and then passes the signals on down their respective network lines. For example, the IoT panel 101 is configured to make current measurements on the signals passing through it. The IoT panel 101 is described in further detail below, in conjunction with FIG. 3.

The IoT outlet 103 may be embodied as a telecommunications outlet, for example, an Ethernet wall plate RJ45 outlet. The IoT outlet 103 is configured to include circuitry capable of measuring current passing through one or more cable conductors and/or patch cord conductors connected to a port of outlet 103. Gateway 105 includes software and/or hardware that joins the IoT panels 101 and/or the IoT outlets 103 to other software systems, including for example, the Internet, data storage systems, Network Management Systems (NMS), building energy management systems, or the like. Various embodiments of gateway 105 have the capability to store measured current readings, measured temperature readings, other measured readings, and inputted data and/or parameters. Embodiments of gateway 105 are configured to perform analytics using data from IoT panels 101, IoT outlets 103 or other sources, and pass that information through wired and/or wireless communication networks to other software systems for decision analysis.

In various embodiments the temperature measurement system 107 includes a number of temperature sensors configured to take local temperature readings at multiple points along cable pathways. Various embodiments of the temperature measurement system 107 may also be configured to provide the data through wired and/or wireless communication networks, to the IoT panels 101, to the IoT outlets 103 and/or to the gateway 105. In various embodiments the temperature measurement system 107 also includes temperature sensors within the IoT outlets 103.

Figure 2:
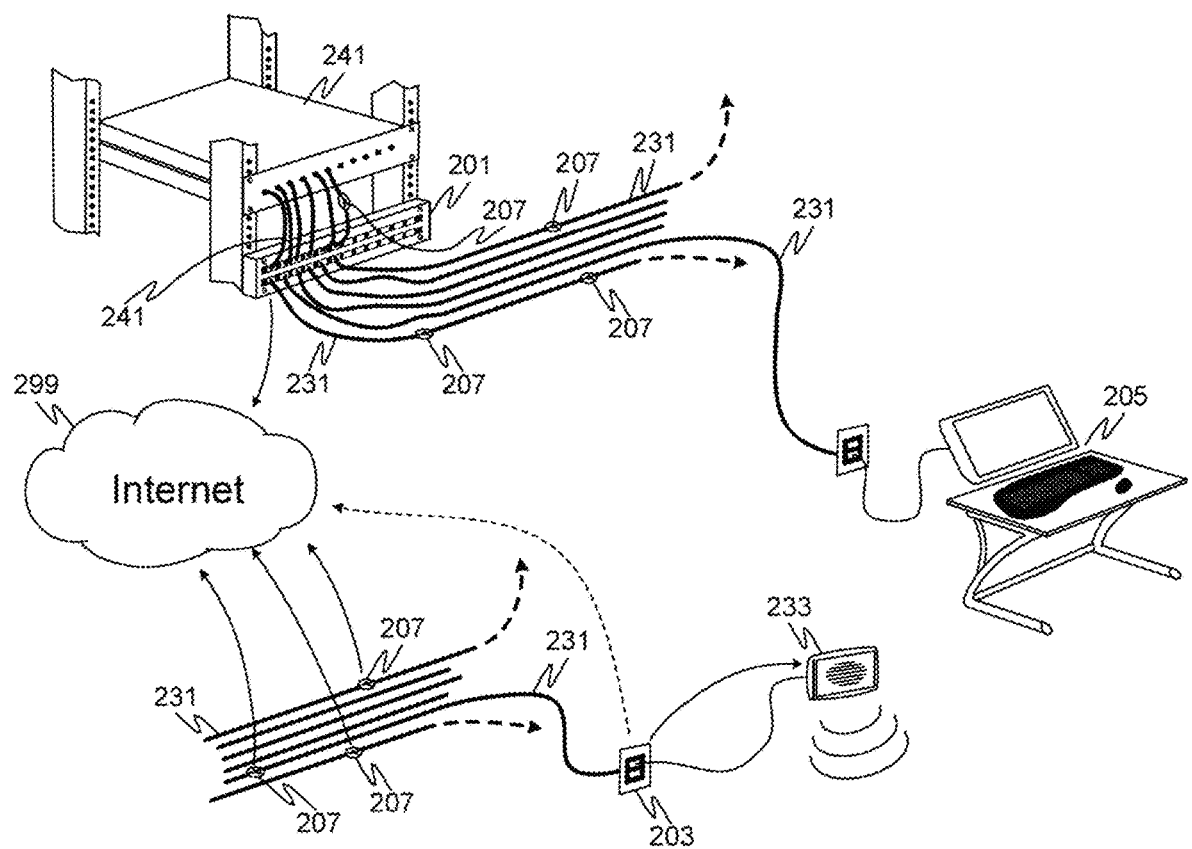
FIG. 2 depicts a typical interconnection of system components in a cable network system according to various embodiments.

FIG. 2 depicts a typical interconnection of system components according to various embodiments. The network switch 241 is often installed in a wiring closet of the building where the LAN system is set up. Various embodiments of the LAN cable monitoring system disclosed herein includes a gateway 205, temperature sensors 207 and IoT devices that may be embodied in the form of an IoT panel 201 (sometimes called an intelligent patch panel) or IoT outlets 203. The gateway 205 and IoT panels 201 or IoT outlets 203 may, in some embodiments, be communicatively coupled through wired and/or wireless network connections to enable them to communicate with each other. For example, these components may communicate with each other by being connected directly, may communicate via the Internet 299, or may communicated by either being connected to cable conductors 231 or connected to a wireless node 233 on the LAN.

The IoT panel 201 which serves as an IoT device is typically inserted in-line on the signal lines coming out of network switch 241. This may be done using jumper cables 241. The IoT panel 201 receives all signals sent from network switch 241, monitors or measures the current sent through the signal lines (or through unused lined dedicated to power transmission), and then passes the signals (and current) on down their respective network lines. In addition to the IoT panel 201 measuring the current on each cable conductor 231, the temperature sensors 207 measure local temperatures at various points within the network where they are installed. The term "local temperature" as that term is used herein means the temperature at a particular point, that is, at the location of the sensor. The temperature sensors 207 are typically installed directly on a cable so as to provide the most accurate local temperature reading for the cable. In some situations that is not possible due to proximity constraints. In such situations the temperature sensor 207 may be installed on a nearby cable bundle hangar, bracket, or other cable installation hardware, or on a wall, ceiling tile or other portion of the building.

The temperature may vary considerably at various points along cable conductor. The local temperature indicates the reading at a particular temperature sensor 207. The data from these measurements allows the system to calculate the temperature of cable bundles. If the temperature in a cable bundle nears or exceeds a predetermined limit, the IoT panel 201 or the IoT outlet 203 may be configured to "block" further requests to turn up (allow power to pass through) a new port associated with that cable bundle. If the cable bundle temperature exceeds a second, higher predetermined limit, the IoT panel 201 or the IoT outlet 203 may be configured to reduce the current passing through the cable bundle.

Data cables generally have a maximum cable temperature rating. If a cable in a bundle operates at or near its maximum temperature rating for prolonged periods, the electrical and mechanical performance of the cable will be negatively impacted and data signals will be attenuated. For bundled cables, the temperature issue may be exacerbated for cables that are closest to the middle of the bundle. Different segments along a run of bundled cables can experience different ambient temperatures which may influence the amount of power that can be supplied by the cables and the attenuation of the data being sent through the cables. According to TIA TSB-184, the maximum ambient temperature of 45° C. is presumed in conjunction with cabling with a maximum rating of 60° C., thus allowing a maximum temperature rise of 15° C. on any cable within the bundle due to dc powering.

TABLE 1

Maximum bundle size for 15° C. temperature rise at 45° C. ambient.

| | 26 AWG | | Category 5e | | Category 6 | | Category 6A | | Category 8 | |
|---|---|---|---|---|---|---|---|---|---|---|
| | Air | Conduit | Air | Conduit | Air | Conduit | Air | Conduit | Air | Conduit |
| 600 mA | 124 | 68 | 191 | 129 | 252 | 182 | 313 | 242 | 918 | 514 |
| 720 mA | 75 | 39 | 121 | 79 | 163 | 114 | 203 | 151 | 581 | 317 |
| 1000 mA | 28 | 13 | 51 | 31 | 72 | 46 | 90 | 62 | 243 | 125 |

In the latest draft of IEEE 802.3bt for PoE, Type 3 and Type 4 Power Source Equipment (PSEs) and Power Devices (PDs) will allow from 600 to 960 mA of current to be sent down each pair of conductors in the cable. If PDs start drawing 600 to 960 mA of current, and the ambient temperature of the plenum space is higher than 45° C., then the number of cables per bundle, as specified in the table above, should be reduced to avoid exceeding the temperature threshold. The 2017 National Electrical Code (NEC) has been revised to address the above problem. Code enforcement officials will need to make sure new construction conforms to the revisions, and over temperature situations do not occur. In the meantime some existing equipment installed according to previous guidelines may experience degradation or failures due to excessive cable temperatures.

The power for the gateway 205 is typically through the AC power system supplied on the premises. In some embodiments where the gateway 205 is implemented in module form the power may be PoE. Power for at least one of the IoT panels 201 in a network equipment rack is typically either AC or PoE. The remaining IoT panels 201 in the network equipment rack, if any, may be powered via a bus connection to the AC or by a PoE powered patch panel in that rack. In at least some embodiments the IoT (patch) panels 201 have a battery backup (e.g., with trickle charging) in the event power over the bus is lost. The battery backup power is designed to ensure operation of the blocking function even if the panel loses power.

The installer can program the IoT panels 201 with a port-to-bundle map that follows the cable installation designer's guidelines or as-built records. This programming may be performed with a smartphone app or other software user interface through a wired or wireless network connection. Communications between the IoT panels 201 and/or IoT outlets 203 and the gateway 205, if implemented, can be either wired or wireless. Communications between the gateway 205 and network switch 241 can be either wired (e.g., via conductor cables 231) or wireless (via wireless node 233). Communications between the gateway 205 and network switch 241 may be controlled using the switch management software.

The blocking function is typically set up to be automatic and not require intervention by a human being. The gateway 205 will typically be configured to notify the network switch 241 that a port turn-up was blocked by an IoT panel 201 or an IoT outlet 203 due to a potential over current or temperature situation. In most situations the blocking is set up to remain active until the current and temperature numbers are within the allowable limits. Once the current and temperature numbers are within the allowable limits, the patch panel port may be reset either mechanically or electronically.

The control parameters specifying control of the LAN cable monitoring system may be set up through the gateway 205 and/or by using a smartphone app or other software user interface coupled to an IoT panel 201 or an IoT outlet 203. The control parameters include a first predetermined temperature limit that, if exceeded, will result in PoE turn up requests to be denied. A parameter specifying a second, higher predetermined temperature limit will result in certain PoE current levels being reduced. Exceeding (or meeting) either the first or second temperature limit may affect PoE current levels on signal line other than the line where the temperature was detected.

Figure 3:
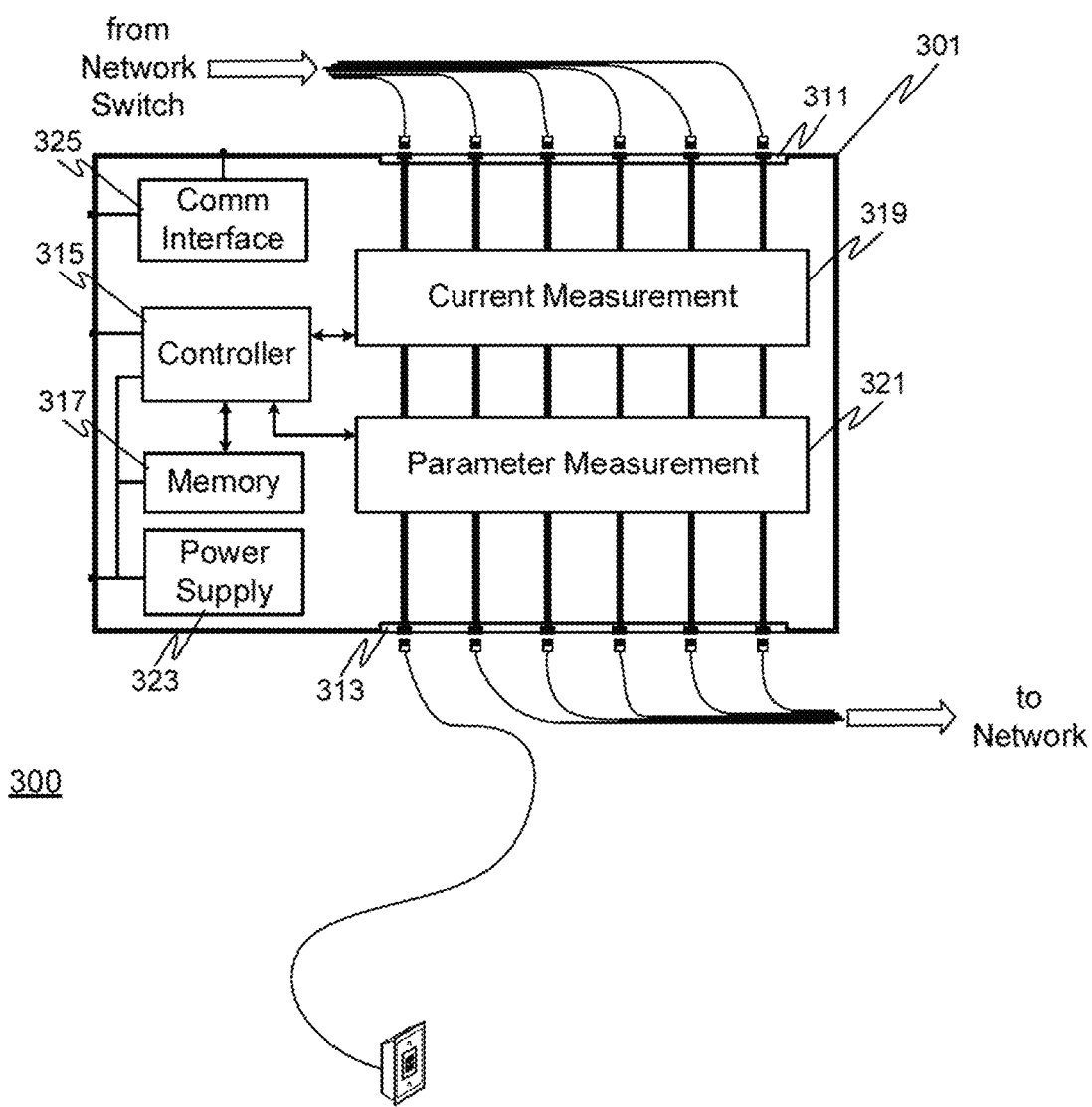
FIG. 3 is a block diagram of an Internet of Things (IoT) panel according to various embodiments.

FIG. 3 is a block diagram of an IoT panel 301 which corresponds to IoT panel 101 of FIG. 1. IoT panel 301, as an IoT device, is inserted in-line on the signal lines coming from a network switch such as network switch 241 of FIG. 2. IoT panel 301 is configured to pass through the data signals and current from the network switch. The IoT panel 301 takes current measurement readings on the signals. IoT panel 301 includes an input patch panel 311 with a number of IoT input ports configured to receive signals from a network switch. IoT panel 301 also includes output patch panel 313 with IoT output ports corresponding to the IoT input ports. Although the block diagram in FIG. 3 depicts the input patch panel 311 and the output patch panel 313 on opposite sides of the IoT panel 301, in practice the IoT input ports and the IoT output ports may be configured on the same patch panel or on two patch panels positioned near each other on the IoT panel 301.

The IoT input ports of the IoT panel 301 are connected to the network switch ports via cable conductors and/or patch cord conductors. Conventional network switches generally have either 12 ports or 24 ports. The various implementations of IoT panel 301 may be configured with any number of ports, but typically have either 12 or 24 input and output ports in order to correspond to conventional network switches. Alternatively, some embodiments of IoT panel 301 are configured with six input/output port pairs (or four input/output port pairs, three input/output port pairs, etc.), allowing two or more IoT panels 301 to be ganged together and used for a given conventional network switch, e.g., having either 12 or 24 ports.

The IoT panel 301 is configured with a current measurement unit 319 capable of making current measurements on the signals passing through it. Various embodiments of IoT panel 301 are configured with a controller 315 to control the current measurements. The IoT panel 301 may be implemented to continuously measure the current of the signals passing through it. The IoT panel 301 may also be configured to make periodic current measurements, or be programmed to make current measurements in predefined time intervals or at certain times of the day, for example, at times of expected high traffic (or at times of expected low traffic or no traffic). The current measurement circuitry of the IoT panel 301 is designed to minimally affect the signals themselves to the extent possible so as not to degrade the signals or possibly introduce errors or noise. Some embodiments of IoT panel 301 are configured with parameter measurement hardware 321 to take other parameter measurements, including, for example, voltage measurements, power measurements, temperature measurements, timing measurements or other such parameters for gauging the performance of the network switch as known to those of ordinary skill in the art.

Figure 5:
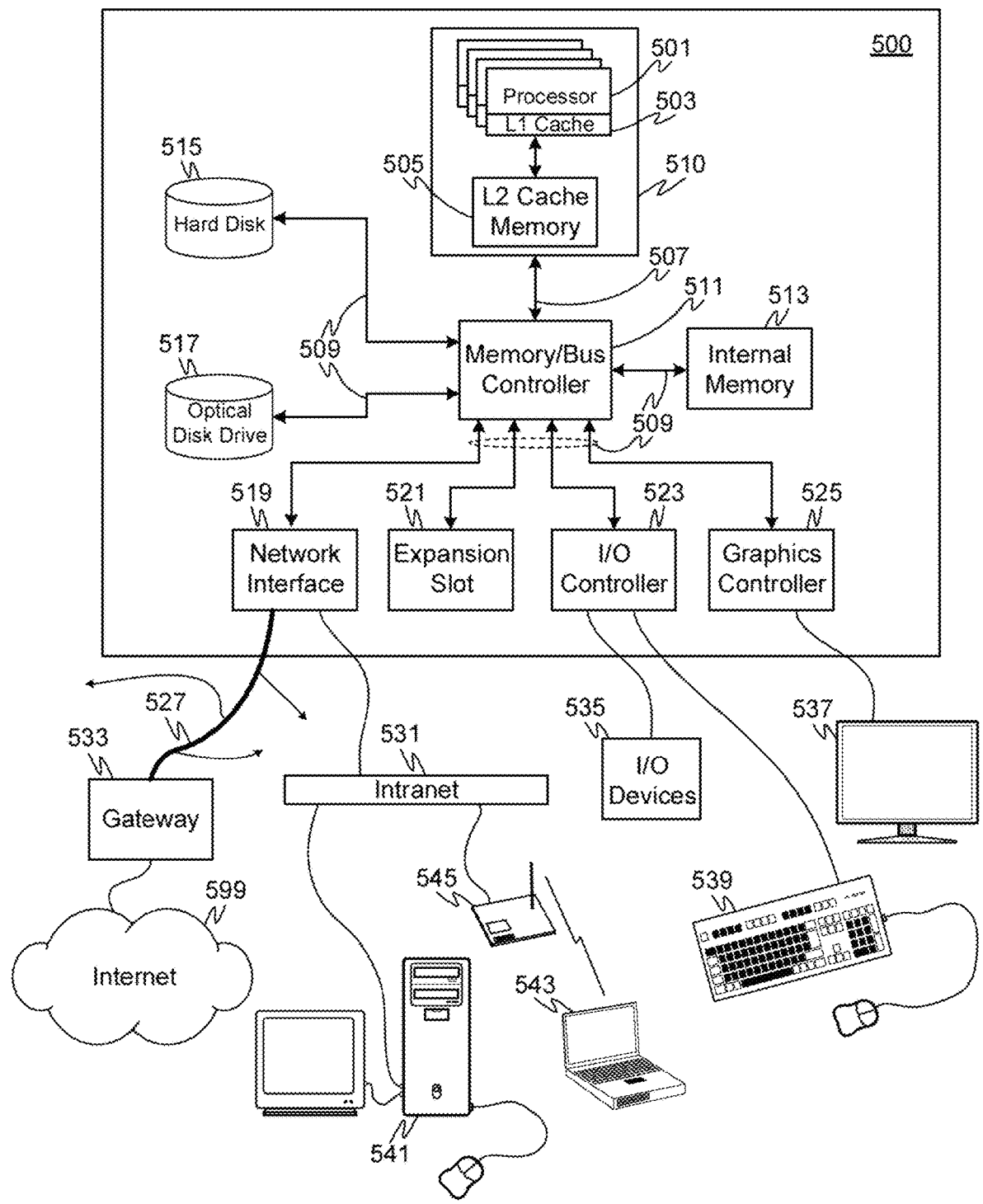
FIG. 5 depicts a computer system with components suitable for use in implementing the various embodiments disclosed herein.

In various embodiments the IoT panel 301 is implemented with the capability to store measured current readings, or other measured readings and inputted data. IoT panel 301 may be configured with memory 317 for storing the current readings or other data. Based upon the stored information, the IoT panel 301 can perform analytics and use the results of the analytics to make decisions and change the state (on/off) of the panel connector ports. The analytics can be performed under control of controller 315 or under control of a microprocessor or controller connected to IoT panel 301, e.g., a smart phone connected to IoT panel 301. Controller 301 and memory 317 may be implemented using a number of different types of microprocessors and/or storage media, including for example, the microprocessors and storage media described below for the general purpose computer depicted in FIG. 5.

In some embodiments the IoT panel 301 includes a power supply 323 to provide power to the other components of the IoT panel 301. The power supply 323 can also be configured to supply power to other IoT panels within the same rack or instrument bay, or otherwise positioned nearby. As such, not all IoT panels need to include a power supply—that is, IoT panels can share a common power supply 323.

In various embodiments the IoT panel 301 is designed to receive control signals and to provide access to information stored in it through wired and/or wireless communication networks. The IoT panel 301 can be connected to other IoT panels via a wired bus or wirelessly. In practice the functionality of the IoT panel 301 may be implemented wholly or piecemeal within the patch panel or network switch itself, the Ethernet switch port or module, or another assembly or module within the wiring closet. To facilitate communication of data and control signals the IoT panel 301 may be configured with a communication interface 325.

The system may include a number of IoT outlets such as IoT outlet 203 depicted in FIG. 2, which corresponds to IoT outlet 103 of FIG. 1. The IoT outlets 203 serve as IoT devices and may be designed with capabilities similar to the IoT panel 301 described above. IoT outlet 203 may be embodied as a telecommunications outlet configured to include circuitry capable of measuring current passing through its ports. IoT outlet 203 also has the capability to store measured current readings, measured temperature readings, or other measured readings and inputted data. Based upon the stored information, some embodiments of the IoT outlet 203 may be configured to perform analytics and use the results of the analytics to make decisions and change the state (on/off) of its outlet port and impose PoE current constraints on one or more cable connectors.

Some implementations of IoT outlet 203 may be powered and provide access to information stored in it through wired and/or wireless communication networks. The IoT outlet power source may be from the buildings electrical system (e.g., wired into an AC line) or may be a battery contained within the IoT outlet 203. The IoT outlet current measurement is, for the purposes of this disclosure, any current measurement that is performed by the system aside from the current measurement of the IoT panel—e.g., any current measurement performed outside the wiring closet.

Figure 4A:
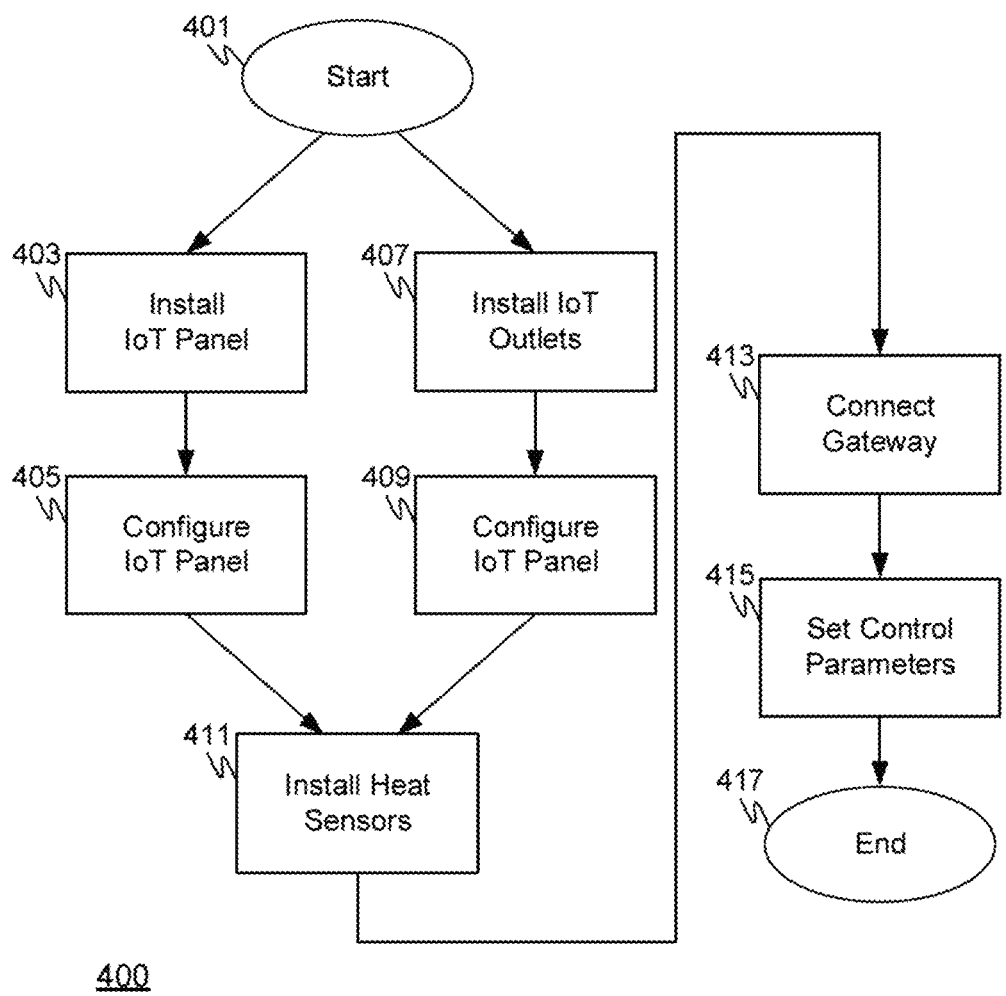
FIGS. 4A-B depict flowchart of steps for setting up the system and practicing methods according to various embodiments disclosed herein.

FIG. 4A depicts a flowchart of method steps for setting up a LAN cable monitoring system according to various embodiments disclosed herein. The method begins at block 401 and proceeds to either 403 or 407, depending upon whether an IoT panel or an IoT outlet is to be installed. Tor configuring an IoT panel—for example, the IoT panel 201 depicted in FIG. 2—the method proceeds to block 403. The IoT panel may be installed by physically attaching it to the rack that houses the network switch to which the IoT panel will be coupled. If there is no rack, or if there is no room on an existing rack, the IoT panel may be positioned proximate the network switch so as to allow routing the network switch cables to the IoT panel. The IoT panel is installed in-line on the signal lines coming out of the network switch. Once the IoT panel is installed in place and the network switch cable are attached to it the method proceeds to block 405. The control parameters may be programmed into the IoT panel to specify communications options for system warnings, setting the temperature limits, specifying the current limits, setting up the software options, and providing other directions and programming for controlling and running the LAN cable monitoring system. Back in block 401 if one or more IoT outlets are to be installed the method proceeds to block 407 instead of block 403. The IoT outlets are typically installed in same locations as conventional RJ45 outlet jacks of the LAN. Once the IoT outlets are installed the method proceeds to 409 to configure the IoT jacks in a manner similar to the configuration of the IoT panel described above. Once the control parameters have been entered into either the IoT panel of the IoT jacks the method proceeds to block 411.

In block 411 the heat sensors are installed. Typically heat sensors are installed along the cable conductor lines. But they may be installed at any point deemed like to indicate a temperature related issue. For example, a heat sensor could be installed on the outside of the network switch box, on file hangars or bracketing hardware for cable bundles or even within an air conditioning duct (to provide early warning of air conditioning failure). Once installation of the heat sensors is completed the method proceeds to block 413 to connect the gateway.

The gateway—for example, gateway 205 of FIG. 2—provides Internet access to the various components of the system. The gateway is typically provisioned with software and/or hardware that communicatively couples the IoT panels and/or the IoT outlets to other software systems, including for example, the Internet, data storage systems, Network Management Systems (NMS), building energy management systems, or the like. Upon completing the connections for the gateway in block 413 the method proceeds to block 415 to set the control parameters and program the system to accomplish the desired operation.

The control parameters may entered directly into the IoT panel or IoT outlets as mentioned above using a smart phone app or other user interface, or may be entered via the gateway. Control parameters help to define the way the system operates. They include communications options for system warnings, predetermined temperature limits for the various sensors, predetermined current limits for the IoT panel(s) and IoT outlets, software options, memory and storage settings and timing settings for the system. The timing parameters include specifying how often current and temperature measurements are taken. The prioritization for cable conductors is also stored among the control parameters. For example, if a cable bundle is detected to have exceeded its heat limit (or current limit), the PoE current constraints won't necessarily be imposed on the largest current using cables in the bundle. A certain cable conductor—say, the cable providing power to the wireless nodes— may be carrying more current than another cable conductor—say, a little used VOIP phone in the basement. However, if the wireless node cable has a higher priority it will remain on and unconstrained while the cable conductor to the VOIP phone has PoE current constraints imposed upon it. The control parameters also specify what data (e.g., current and/or temperature data) is to be stored in memory for later access, and what data is to be used in performing calculations for the block functions. The control parameters may also include the access identifications and verifications indicating who has access to the system and specifying what parts of the system they can access, alter or control. The control parameters may also include any other directions and programming for controlling and running the LAN cable monitoring system. Once the control parameters are set in block 415 the method proceeds to block 417 and ends.

Figure 4B:
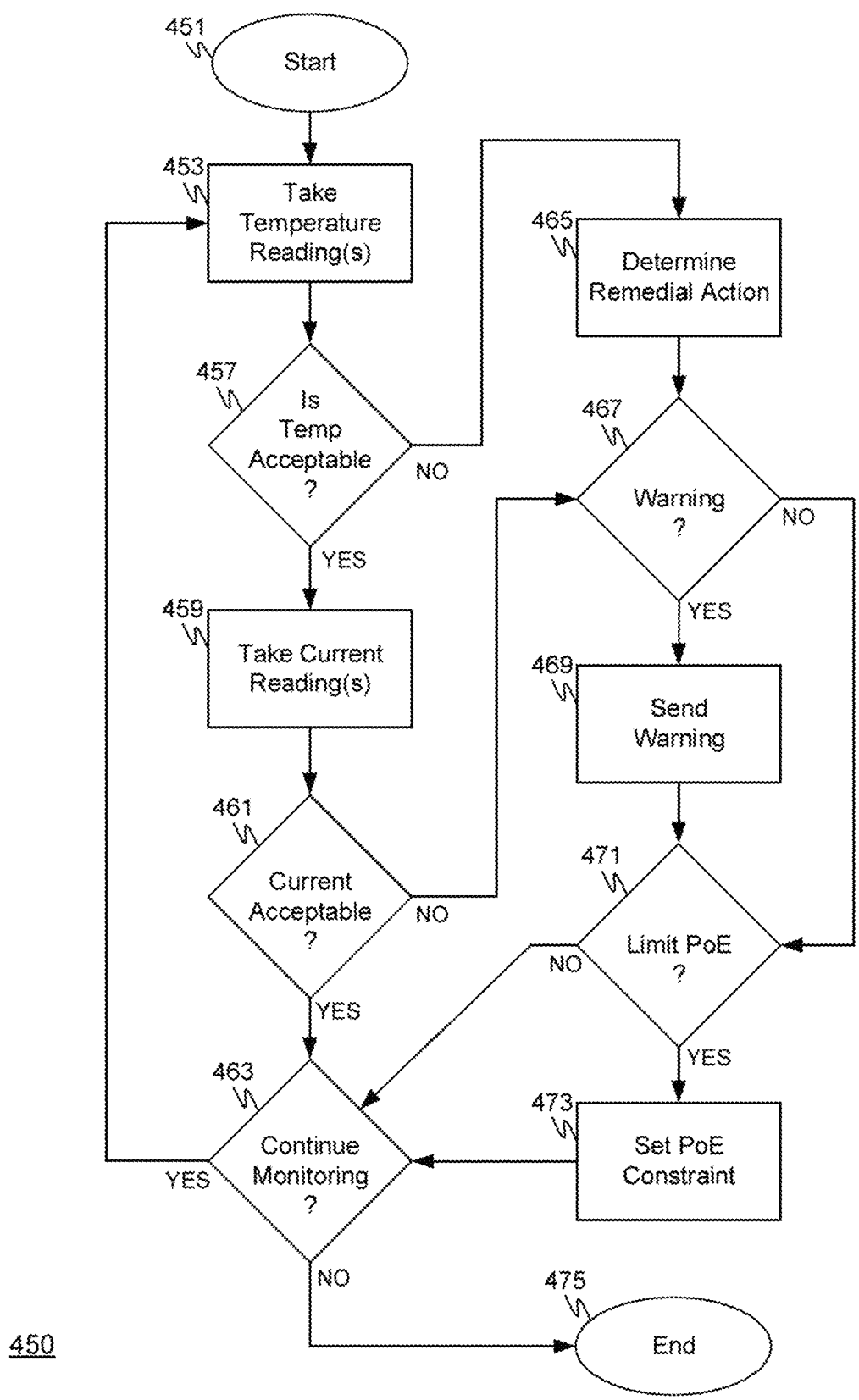

FIG. 4B depicts a flowchart of steps for practicing a method according to various embodiments disclosed herein. The method begins at block 451 and proceeds to block 453 to take the temperature readings. The timing of the temperature readings is controlled by the system, and it may be the case that not all sensors are read at the same time or with the same frequency of readings per day. For example, a sensor on a cable conductor running through an attic may be prone to heating up during the daytime hours, but then is known to cool down to below the interior building temperature during the night hours. Such a sensor could be controlled to be polled for temperature data at one rate during the day—(e.g., once every 10 minutes) and have another slower polling rate at night (e.g., once every 30 minutes). The polling or sampling rate for temperature (or current described below) could be based on whether the reading is getting close to the allowable limit. As the temperature reading get closer to the parameter limit, the polling rate could be automatically sped up so as to avoid going over the limit between measurements.

Upon taking a temperature sensor reading in block 453 the method proceeds to block 457 to determine whether the temperature is within the allowable range. If the temperature exceeds a predetermined temperature parameter limit the method proceeds to block 465 along the "NO" path to determine the remedial action. Depending upon which threshold was exceeded the remedial action may be to either deny port turn up requests for one or more cable conductors in the offending bundle, or to reduce the amount of PoE current of the cables. The cable conductor priority is another determination that is made in block 465. The system parameter settings may be such that the lowest priority conductor cables are constrained first, even before conductor cables that may be carrying more current if they have a higher priority rating. The parameters setting may involve denying port turn up requests for some cables and reducing the PoE current levels for other cables. Once the remedial action is determined and imposed in block 465 the method proceeds to block 467.

Back in block 457 if the temperature reading is within acceptable levels the method proceeds along the "YES" path to block 459. In block 459 the IoT panel or the IoT outlet(s) are controlled to take current readings on one or more cable conductors. Upon taking the current readings the method proceeds to block 461 to determine whether the current is within an acceptable level. If the current exceeds a predefined limit the method proceeds from block 461 along the "NO" path to block 467. In block 467 it is determined whether a warning will be sent out or not, and if so, to whom the warning will be sent. The system parameters (described above in conjunction with block 413 of FIG. 4A) determine who will receive various system warning. The system parameters can be set up to send a system warning to one or more system administrators, technicians or managers. The system parameters may also be set up to send a warning to the device itself. For example, it could be the case that a cable conductor to a VOIP phone near a user's computer is running through a bundle that is overheating. A warning could be sent to the user's computer informing the user that the VOIP phone will be turned off within a given time frame—e.g., in 10 minutes. Sending a warning such as this could give the user a chance to respond, for example, by clicking on a link within the warning and indicating that the VOIP phone to be turned off is needed for a given time period. If, in block 467 it is determined that a warning is to be sent the method proceeds along the "YES" path to block 469 to send the warning, and then on to block 471. However, if no warning is to be sent the method proceeds along the "NO" path to block 471.

In block 471 it is determined whether a PoE current constraint is to be imposed. The current limit may either be in the form of denying any subsequent port turn up requests for a given set of cables, or may be the harsher, current constraint of reducing the existing level of allowed current flow for one or more cable conductors. The affected cable conductor(s) may be determined based on the entered priority of the cable conductors, current usage, the time of the day, responses to any warnings that may have been sent, or other factors as are known by those of ordinary skill in the art. If, based on the various factors and control parameter setting, it is determined in block 471 that a PoE current constrain is to be imposed, the method proceeds along the "YES" path to block 473. In block 473 the appropriate constraint is imposed on the indicated cable conductors. The method proceeds from block 473 to block 463.

In block 463 it is determined whether the monitoring and current and/or temperature readings are to continue. It may be the case that a system administrator is shutting down the system to implement a software upgrade or replace a hardware module. In such a situation the method proceeds along the "NO" path to block 475 to cease all monitoring and parameter readings. However, if it is determined in block 463 that the monitoring is to continue the method loops back along the "YES" path to block 453 for further polling of temperature and/or current measurements.

The internal memory 513 may include one or more of random access memory (RAM) devices such as synchronous dynamic random access memories (SDRAM), double data rate (DDR) memories, or other volatile random access memories. The internal memory 513 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the computer system 500 may also include $3^{rd}$ level cache memory or a combination of these or other like types of circuitry configured to store information in a retrievable format. In some implementations the internal memory 513 may be configured as part of the processor 501, or alternatively, may be configured separate from it but within the same package 510. The processor 501 may be able to access internal memory 513 via a different bus or control lines than is used to access the other components of computer system 500.

The computer system 500 may also include, or have access to, one or more hard drives 515 (or other types of storage memory) and optical disk drives 517. Hard drives 515 and the optical disks for optical disk drives 517 are examples of machine readable (also called computer readable) mediums suitable for storing the final or interim results of the various embodiments. The optical disk drives 517 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 500 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable or machine readable storage medium.

The computer system 500 may either include the hard drives 515 and optical disk drives 517 as an integral part of the computer system 500 (e.g., within the same cabinet or enclosure and/or using the same power supply), as connected peripherals, or may access the hard drives 515 and optical disk drives 515 over a network, or a combination of these. The hard drive 515 often includes a rotating magnetic medium configured for the storage and retrieval of data, computer programs or other information. In some embodiments, the hard drive 515 may be a solid state drive using semiconductor memories. In other embodiments, some other type of computer useable medium may be used. The hard drive 515 need not necessarily be contained within the computer system 500. For example, in some embodiments the hard drive 515 may be server storage space within a network that is accessible to the computer system 500 for the storage and retrieval of data, computer programs or other information. In some instances the computer system 500 may use storage space at a server storage farm, or like type of storage facility, that is accessible by the Internet 599 or other communications lines. The hard drive 515 is often used to store the software, instructions and programs executed by the computer system 500, including for example, all or parts of the computer application program for carrying out activities of the various embodiments.

The communication link 509 may be used to access the contents of the hard drives 515 and optical disk drives 517. The communication links 509 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller may also provide other I/O communication links 509. In some embodiments, the links 509 may be a shared bus architecture such as peripheral component interface (PCI), microchannel, industry standard architecture (ISA) bus, extended industry standard architecture (EISA) bus, VERSAmoduleEurocard (VME) bus, or any other shared computer bus. In other embodiments, the links 509 may be a point-to-point link such as PCI-Express, HyperTransport, or any other point-to-point I/O link. Various I/O devices may be configured as a part of the computer system 500.

In many embodiments, a network interface 519 may be included to allow the computer system 500 to connect to a network 527 or 531. Either of the networks 527 and 531 may operate in accordance with standards for an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A network gateway 533 or router, which may be a separate component from the computer system 500 or may be included as an integral part of the computer system 500, may be connected to the networks 527 and/or 531 to allow the computer system 500 to communicate with the Internet 599 over an internet connection such as an asymmetric digital subscriber line (ADSL), data over cable service interface specification (DOCSIS) link, T1 or other internet connection mechanism. In other embodiments, the computer system 500 may have a direct connection to the Internet 599. The computer system 500 may be connected to one or more other computers such as desktop computer 541 or laptop computer 543 via the Internet 599, an intranet 531, and/or a wireless node 545. In some embodiments, an expansion slot 521 may be included to allow a user to add additional functionality to the computer system 500.

The computer system 500 may include an I/O controller 523 providing access to external communication interfaces such as universal serial bus (USB) connections, serial ports such as RS-232, parallel ports, audio in and audio out connections, the high performance serial bus IEEE-1394 and/or other communication links. These connections may also have separate circuitry in some embodiments, or may be connected through a bridge to another computer communication link provided by the I/O controller 523. A graphics controller 525 may also be provided to allow applications running on the processor 501 to display information to a user. The graphics controller 525 may output video through a video port that may utilize a standard or proprietary format such as an analog video graphic array (VGA) connection, a digital video interface (DVI), a digital high definition multimedia interface (HDMI) connection, or any other video connection. The video connection may connect to display 537 to present the video information to the user.

The display 537 may be any of several types of displays or computer monitors, including a liquid crystal display (LCD), a cathode ray tube (CRT) monitor, on organic light emitting diode (OLED) array, or other type of display suitable for displaying information for the user. The display 537 may include one or more light emitting diode (LED) indicator lights, or other such display devices. Typically, the computer system 500 includes one or more user input/output (I/O) devices such as a keyboard and mouse 539, and/or other means of controlling the cursor represented including but not limited to a touchscreen, touchpad, joystick, trackball, tablet, or other device. The user I/O devices 535 may connect to the computer system 500 using USB interfaces or other connections such as RS-232, PS/2 connector or other interfaces. Various embodiments include input devices configured to accept an input from a user and/or provide an output to a user. For example, some embodiments may include a webcam (e.g., connect via USB), a microphone (e.g., connected to an audio input connection), and/or speakers (e.g., connected to an audio output connection). The computer system 500 typically has a keyboard and mouse 539, a monitor 537, and may be configured to include speakers, microphone, and a webcam. These input/output devices may be used in various combinations, or separately, as means for presenting information to the user and/or receiving information and other inputs from a user to be used in carrying out various programs and calculations. Speech recognition software may be used in conjunction with the microphone to receive and interpret user speech commands.

The processor 501 may be embodied as a microprocessor, microcontroller, DSP, RISC processor, two or more parallel processors, or any other type of processing unit that one of ordinary skill would recognize as being capable of performing or controlling the functions, steps, activities and methods described herein. A processing unit in accordance with at least one of the various embodiments can operate computer software programs stored (embodied) on computer-readable medium such those compatible with the disk drives 515, the optical disk drive 517 or any other type of hard disk drive, floppy disk, flash memory, ram, or other computer readable medium as recognized by those of ordinary skill in the art.

Figure 6:
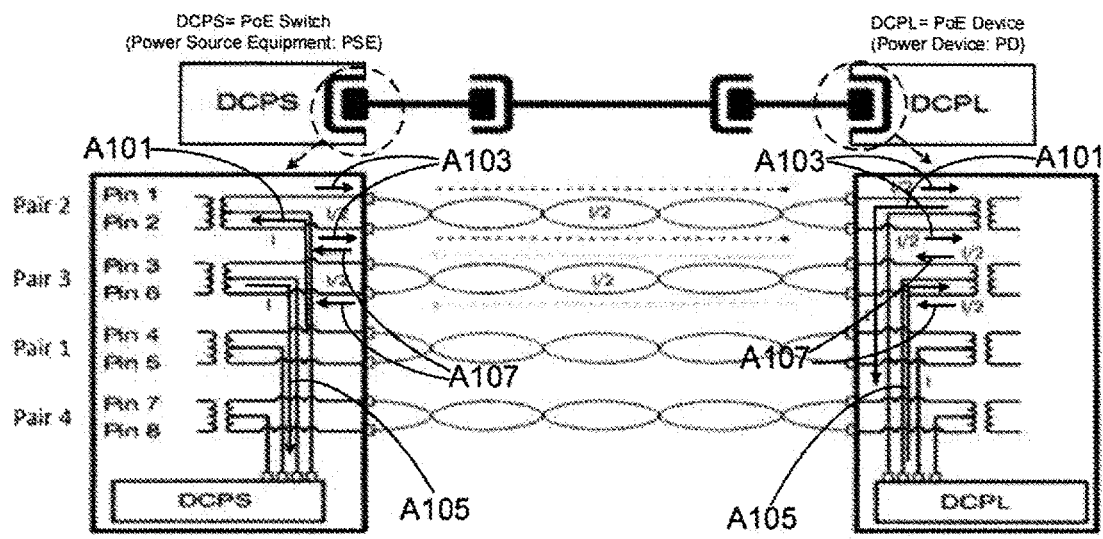
FIG. 6 depicts a Power Transmission Scheme for a PoE Application.

FIG. 6 depicts a Power Transmission Scheme for a PoE Application. Power-over-Ethernet (PoE) utilizes twisted-pair data cabling as the medium to transmit direct current (DC) between the power source equipment (PSE) and the power device (PD) while simultaneously supporting Ethernet traffic. The invention described below is a detection technique that prevents a twisted-pair cable from overheating when an uneven amount of current flow through the two conductors that provide an outgoing and incoming conducting path between the PSE and PD.

The power transmission scheme of the PoE application is shown in FIG. 6. At the PSE, the outgoing current (I) follows the conducting path (represented by the arrows labeled A101) toward the center tap of a transformer. The current is split evenly (I/2) and follows the conducting path (represented by the blue arrows labeled A103) to each conductor when the DC resistance unbalance (the difference in resistance between two conductors of the same twisted pair) is minuscule. The split current is received by the PD and merged at the center tap of a transformer. The same process occurs for the return path from the PD to the PSE and in order to form a valid electrical circuit. As illustrated in FIG. 6, the return current (represented by the arrow labeled A105) originates from PD and is split evenly (I/2) at the center tap and follows the conducting path (represented by the arrows labeled 107). The split current is received by the PSE and merged at the center tap. This transmission path uses 2 pairs of conductors—Pair 2 (Pin 1,2) and Pair 3 (Pin 3,6). Similarly, Pair 1 (Pin 4,5) and Pair 4 (Pin 7,8) can form another transmission path.

Figure 7:
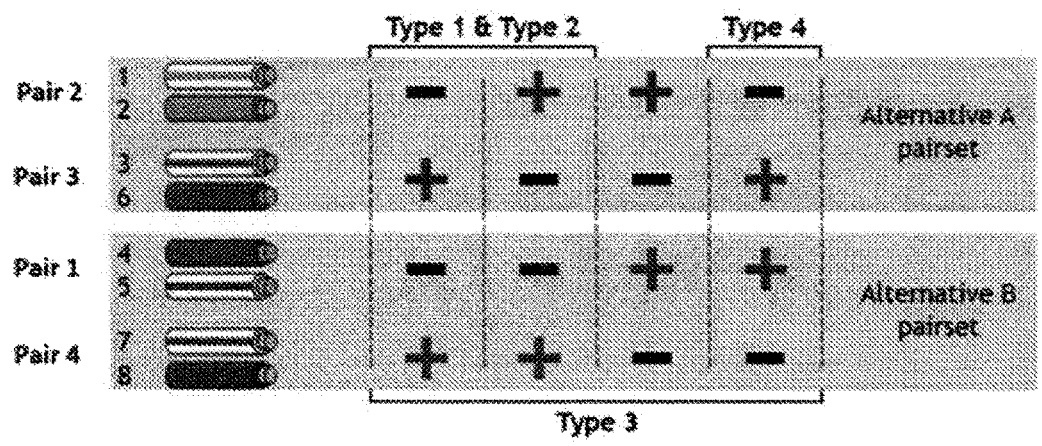
FIG. 7 depicts the Permissible Power Supply Polarity.

The earlier PoE standards (IEEE 802.3af and at) allow only one power transmission scheme whereas the latest PoE standard (IEEE 802.3bt) allows two power transmission schemes. The first utilizes two pair sets (Pair 2,3 OR Pair 1,4) and is referred to as a 2-pair powering scheme. The other power transmission scheme utilizes four pair sets (Pair 2,3 AND Pair 1,4) and is referred to as a 4-pair powering scheme. FIG. 7 captures the permissible polarities for different types of PSEs.

FIG. 7 depicts the Permissible Power Supply Polarity. Type 1 and 2 PSEs employ a 2-pair powering scheme where only two pair sets carry current and the other two pair sets are unused for power transmission. Type 3 and 4 employ a 4-pair powering scheme where all four pair sets carry current simultaneously. The "+" sign represents the outgoing current path from the PSE and the "−" sign represents the current return path from the PD. As shown in FIG. 7, the direction of the current flow for Type 1, 2 and 3 PSEs can vary whereas only one direction is allowed for Type 4 PSE.

In all PoE powering schemes, the current is split at the center tap of a transformer then the split current flows through the conductors. The splitting ratio depends on the DC resistance of the conducting paths. When the DC resistance of those conducting paths are identical or very close, the current splits evenly (I/2). However, DC resistance unbalance can occur during the cabling installation and even after the cabling installation has been certified by an appropriate hand-held tester. DC resistance unbalance is generally caused by poor workmanship, poor termination, and subpar cable quality. If the difference in DC resistance between 2 conducting paths is greater than what is allowed by the standards, the least resistive path will always carry more current than the greater resistive path according to Ohm's law. In the event of a sizable DC resistance unbalance, the split ratio will be highly biased and one conducting path may carry most of the current. As a result, this shift in current can overheat the conductor and cause the cable temperature to elevate over time.

As described in FIG. 6, PSEs and PDs sense the combined current flow, i.e., arrow A101 and arrows A105 shown in the figure. However, PSEs and PDs do not determine how the current is split.

Figure 8:
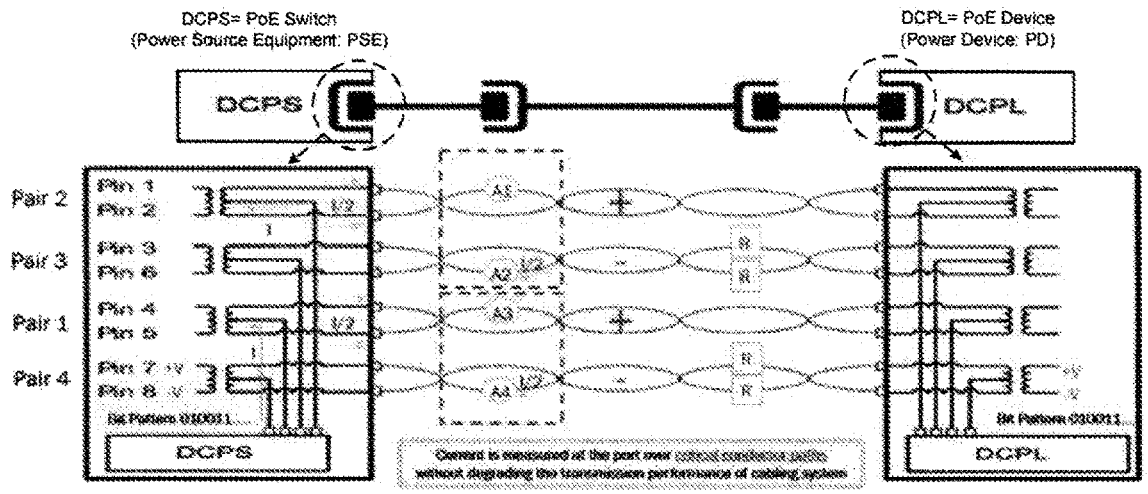
FIGS. 8-9 illustrate implementations of detection techniques and protection mechanisms according to various embodiments disclosed herein.
Figure 9:
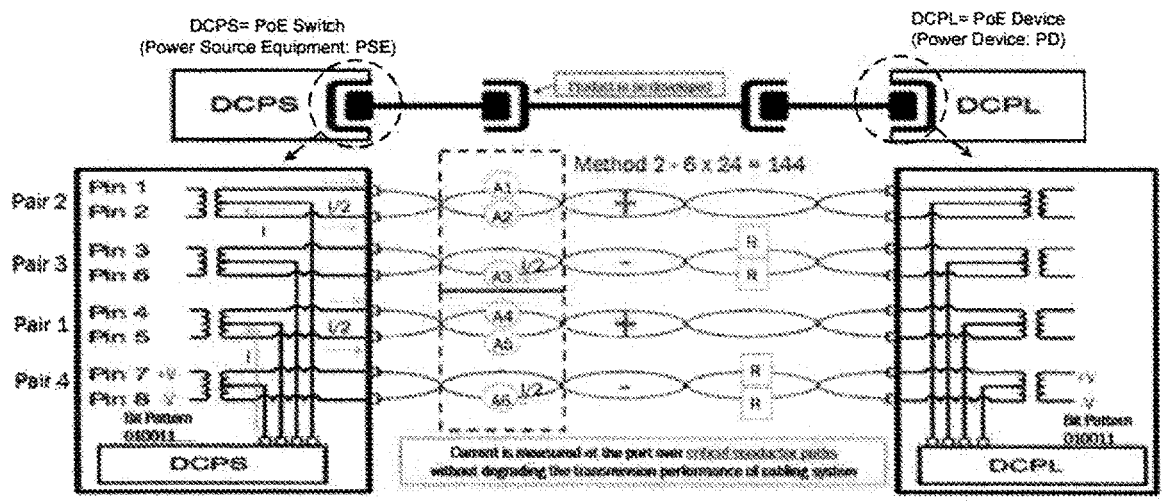

FIGS. 8-9 illustrate implementations of detection techniques and protection mechanisms according to various embodiments. Inline current sensors are used to monitor the current flowing through conductors. Inline relay switches are used to shut off the current flow when necessary. A design optimization is crucial to maintain the electrical performance of the cabling apparatus while accommodating the addition of these components and avoid degrading the overall cabling system performance. FIG. 8 illustrates a first example, Example 1. FIG. 9 illustrates a second example, Example 2.

Turning to FIG. 8, the implementation of Example 1 has one current sensor per pair set. For a 2-pair powering scheme and depending on which 2 pair sets are used to deliver power, sensors A1 and A2 or A3 and A4 should report values that are close to each other. When a higher amount of DC resistance unbalance occurs within a pair of conductors, the correct amount of current (I/2) cannot be easily determined since A1 and A2 or A3 and A4 report very different values. In this case, a pre-defined ratio can be calculated based on these current readings e.g. Ratio (Pair 2,3)=|A1−A2|/Max(A1, A1) or Ratio (Pair 1,4)=|A3−A4|/Max(A3, A4). If the Ratio is much greater than a predetermined value, a DC resistance unbalance alert will be triggered, and the relay switches can shut off the circuit in order to prevent the conductor from overheating. For a 4-pair powering scheme, the readings from all four current sensors will be available. In the normal operating condition without the presence of DC resistance unbalance, all readings should be close to each other. If DC resistance unbalance occurs to one of the pair sets, for instance Pair 2, then the current values obtained from the other two pair sets (Pair 1,4) can be used to set the reference I/2=(A3+A4)/2. Based on the reference current value (I/2) and Ratio (Pair 2,3)=|A1−A2|/Max(A1, A2), the pair set with the DC resistance unbalance can be identified. An alert will trigger and the relay switches can shut off the circuit in order to prevent the conductor from overheating.

Turning to FIG. 9, the implementation of Example 2 establishes a current measurement reference by adding an additional current sensor (A2) to Pair 2 and an additional current sensor (A5) to Pair 1. For a 2-pair powering scheme, when A1≈A2 or A4≈A5 and A3 or A6 has a very different value than 0.5*(A1+A2) or 0.5*(A4+A5), it indicates Pair 3 or Pair 4 needs to be examined for DC resistance unbalance. In another scenario, A1, A2 and A3 or A4, A5 and A6 are all very different but A3=0.5*(A1+A2) or A6=0.5*(A4+A5) then Pair 2 or Pair 1 needs to be examined for DC resistance unbalance. In both cases, Ratio (Pair 2,3)=|A1−A3|/Max(A1, A3) or Ratio (Pair 1,4)=|A4−A6|/Max(A4, A6) is able to determine the severity of the unbalance. For 4-pair powering scheme, the readings from all six current sensors are available. The identical method from the 2-pair powering scheme can be used to determine the severity of the DC unbalance and to identify the problem pair. As with Example 1, an appropriate action can be taken to shut off the circuit with relay switches once the excessive current is detected.

Figure 10A:
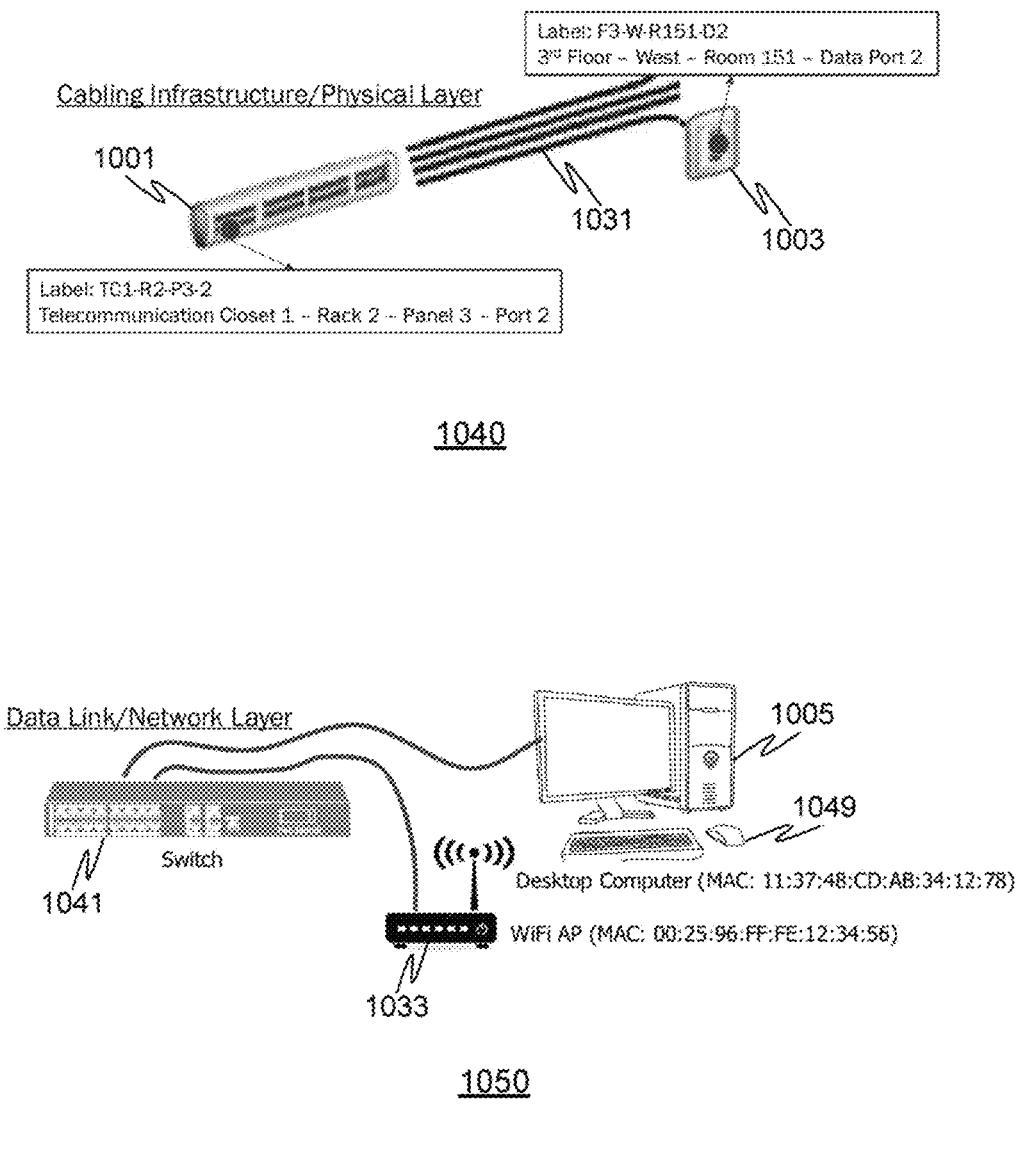
FIG. 10A depicts a cabling infrastructure/physical layer and the data link/network layer of a telecommunications system, according to various embodiments disclosed herein.

FIG. 10A depicts the cabling infrastructure/physical layer 1040 and the data link/network layer 1050 of a telecommunications system 1000 for a site or organization such as a business, an office building, a computer campus or the like. The telecommunications system is crucial to the operations of the operation of most organizations. Internet access, email and often telephone systems depend on the telecommunications system. Over time the telecommunication system undergoes changes as new devices, nodes and capabilities are added, repairs are made, and physical office spaces are remodeled or reconfigured. This can cause difficulty for IT (information technology) technicians and personnel if they lose track of where certain components of the telecommunication system are located.

The cabling infrastructure/physical layer 1040 is made up of the passive physical components and cabling spread throughout the site to provide hardwired connectivity. Electronic communication signals are sent over—or via—the cabling infrastructure/physical layer 1040. The cabling infrastructure/physical layer 1040 may include a number of physical components such as: IoT outlets 1003, cable conductors 1031, IoT panels 1001, and other like types of passive connectivity components known by those of ordinary skill in the art to be connected to, or part of, a telecommunications system 1000. The correlation of cabling ports can be established by a pre-defined labeling scheme and validated through the cable testing phase during the installation.

The physical components of the cabling infrastructure/physical layer 1040 are typically identified by attaching coded labels to them (or writing label codes on them). For example, an IoT panel 1001 may be labeled to identify the closet it is in, its rack location, and the port it is identified with. The label affixed to it in FIG. 10A is coded with: "TC1-R2-P3-2". This tells the IT technician that the IoT panel 1001 is located in Telecomm Closet 1, on Rack 2, at Panel 3, and provides Port 2. The IoT outlets 1003 and cable conductors 1031 may also be labeled. For example, FIG. 10A depicts IoT outlet 1003 labeled with as "F3-W-R151-D2", which in this example identifies the location as being: $3^{rd}$ Floor-West-Room 151-Data Port 2. The information on these example labels are typical for those used in practice. Some labeling schemes may be more detailed, while others have less detail. At minimum the physical label identifies the floor the component is located on, and preferably the room (or other location) as well. This helps the IT technician find the device for troubleshooting, repairs or upgrades.

The network layer 1050 includes active component devices that send and/or receive signals over the cabling infrastructure/physical layer 1040. A network layer 1050 computers 1005, input/output (I/O) devices 1049 (e.g., keyboards, mouses, monitors, printers); wireless nodes 1033, network switches 1041 and other like types of active component devices known by those of ordinary skill in the art to have the capability of sending and/or receiving telecommunications signals and be connected to a telecommunications system physical layer 1040. (Note: The cabling shown in FIG. 10A connecting computer 1005, wireless node 1033 and network switch 1041 is part of the cabling infrastructure/physical layer 1040.)

The active component devices of network layer 1050 are "labeled" to allow the devices to identify and communicate with each other and carry on the telecommunications tasks of the system. The network layer 1050 uses IP addresses (Internet Protocol addresses) and MAC addresses (Media Access Control addresses). For example, in FIG. 10A the computer 1005 has a MAC address of 11:37:48:CD:AB:34:12:78; and wireless nodes 1033 has a MAC address of 00:25:96:FF:FE:12:34:56. When a telecommunications system is first installed a physical component database within the network management software is typically created showing the location of the various physical components associated with each MAC address in the network layer 1050. The correlation between a switch port and an end device can be established after the link is up. There is a unique MAC address associated with each port/device served as the identifier. Over time, however, changes are made as physical components are moved, thrown away or newly added. This degrades the accuracy and usefulness of the physical component database.

All conventional network management software programs available today require manual entry of the physical connection between the panel ports and the corresponding switch ports to establish the linkage between the physical layer and the datalink/network. This manual process is error-prone and requires updates constantly to account for moves, additions and other changes (e.g., new MACs) in a normal operating environment. Various embodiments disclosed herein involve a way to automatically detect and update the correlation between the physical layer 1040 and the data link/network layer 1050 of a telecommunications system.

Figure 10B:
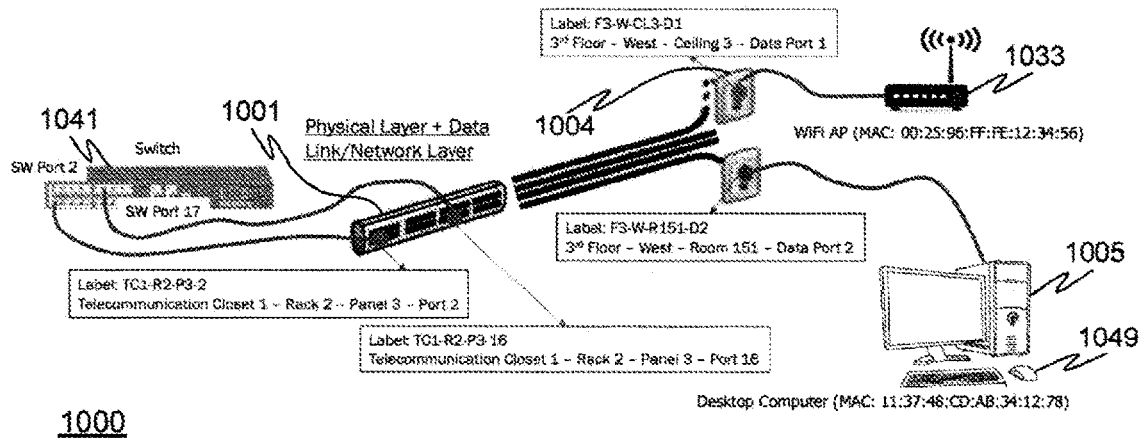
FIG. 10B depicts the telecommunications system of FIG. 10A with a change made to the configuration.

FIG. 10B depicts the telecommunications system 1000 of FIG. 10A with a change made to the configuration. In FIG. 10B the wireless node 1033 has been relocated to a new location and plugged into an IoT outlet 1004 (which is similar to IoT outlet 1003). The wireless node 1033 still has the same MAC address of 00:25:96:FF:FE:12:34:56—but unless the person who moved it also updated the physical component database in the network management software it will still be reflected in the records as being connected directly to network switch 1041, its previous location.

Figure 11A:
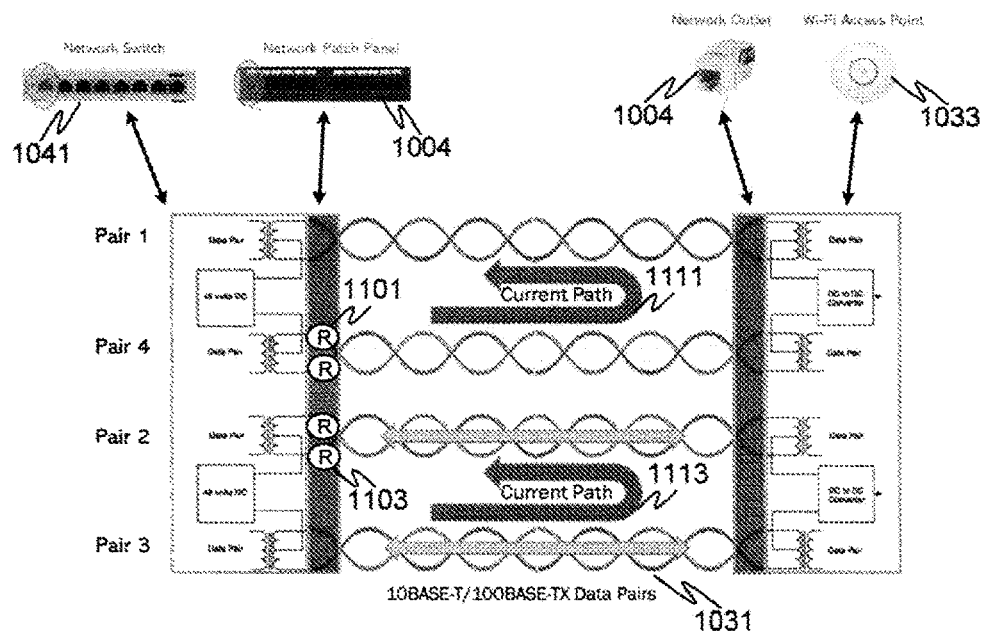
FIGS. 11A-E depict an embodiment disclosed herein implemented on a typical signal path in the telecommunications system from the network switch through an ethernet cable to a device connected to the telecommunications system.

FIGS. 11A-E depicts various embodiments disclosed herein implemented on a typical signal path in the telecommunications system from the network switch through an ethernet cable to an IoT plug with a component plugged into it. For example, FIG. 11A is a schematic representation of the signal path from the network switch 1041 of FIG. 10B connected to patch panel 1001 which is connected via a full duplex twisted pair cable 1031 routed to an IoT outlet 1004 which has a wireless node 1033 plugged into it. In particular, FIG. 11A depicts a 10 base-T/100BASE-TX Transmission with 2-pair powering scheme.

In accordance with the various embodiments the four twisted pairs of the ethernet cable can be used to form two current circuit paths 1111 and 1113—each current circuit having a current path out to the IoT outlet 1004 and back, thus forming a circuit. The various embodiments also feature relay switches (also called "relays") on at least one twisted pair of each of the current circuit paths 1111 and 1113. FIGS. 11A-E depict relay switches 1101 on twisted pair 2, the incoming current path of current circuit 1113, and relay switches 1103 on twisted pair 4, the outgoing current path of current circuit 1111. In other implementations relay switches may be placed on all twisted pair wires of the full duplex twisted pair cable 1031. The relay switches may be controllably switched ON and OFF as part of the process for sensing where a given system component is located.

Figure 11B:
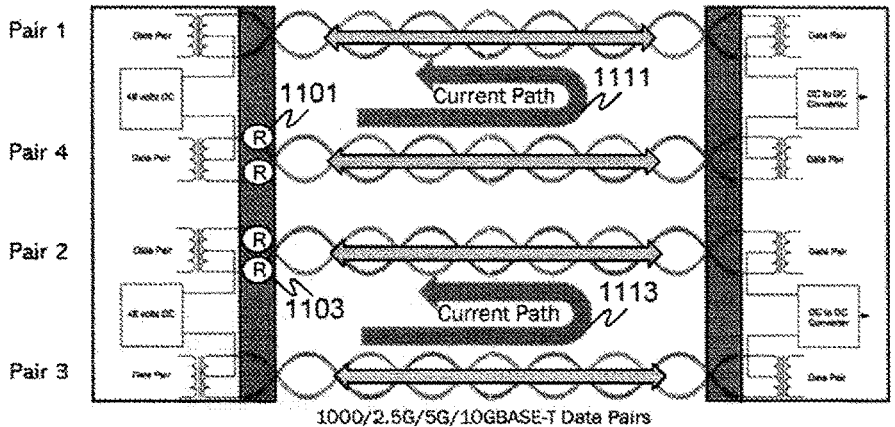
Figure 11C:
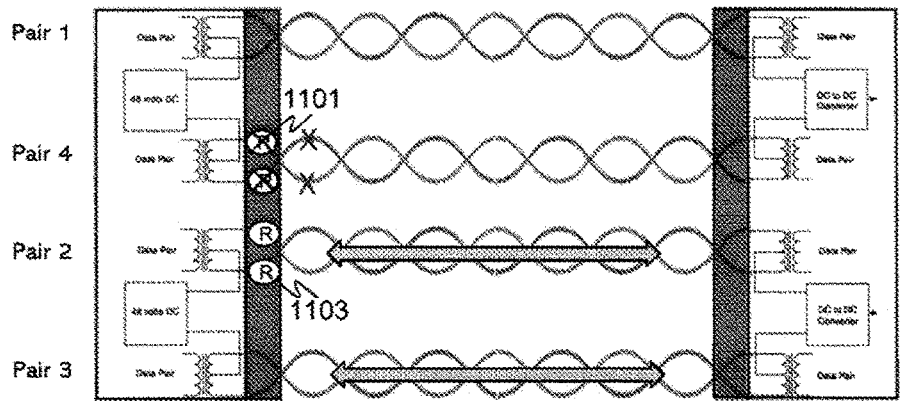

Turning to FIG. 11B, this figure depicts a 1000/2.5G/5G/10GBASE-T transmission with 4-pair powering scheme. All four relay switches 1101-1103 are closed to provide two out-and-back current circuit paths 1111 and 1113. In FIG. 11C the relay switches 1103 remain closed to complete the 1113 circuit path, but relay switches 1101 are activated to provide an open circuit to break the circuit path 1111. With the activation of relay switches 1101, pair 4 is open, and Ethernet transmission is temporally interrupted. After auto-negotiation, the transmission speed is reduced to 100 Mbps or below. Integrating with the switch management software, the active switch port experiencing such a speed change can be identified and the correlation with the panel port can be established.

Figure 11D:
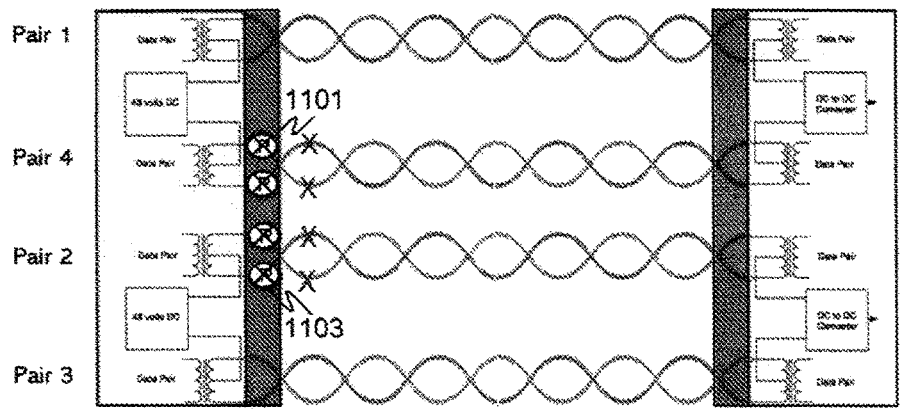
Figure 11E:
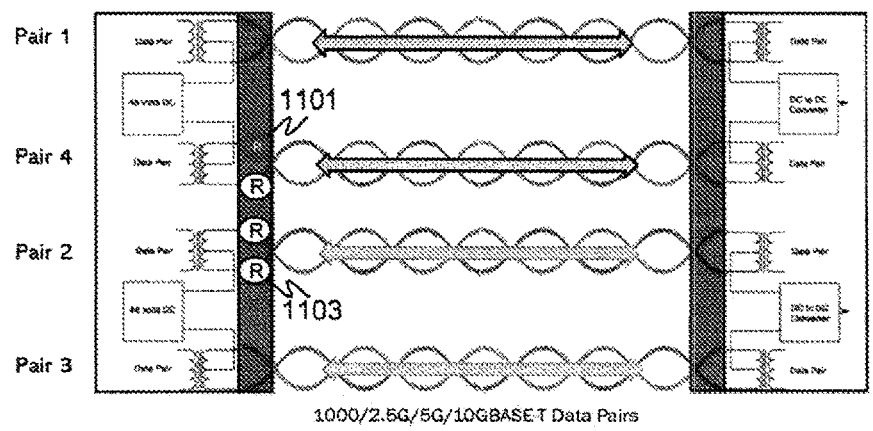

In FIG. 11D all four relay switches 1101-1103 are activated to create open circuits and cut off both out-and-back current circuit paths 1111 and 1113. With the activation of second set of relay switches as compared to the previous figure, pair 2 is open, and Ethernet transmission is reduced to zero. If a switch/panel port correlation has been established. This step serves as a reset. If a switch/panel port correlation has yet been established, a search for the speed reduction of the active switch port (from 100 Mbps or less to 0) via the switch management software can be made. Finally, in FIG. 11E all four relay switches 1101-1103 are deactivated so pair 2 and pair 4 are again available. The original transmission speed will resume. The switch management software may confirm a switch/panel port correlation by observing Ethernet transmission back to normal speed.

Figure 11F:
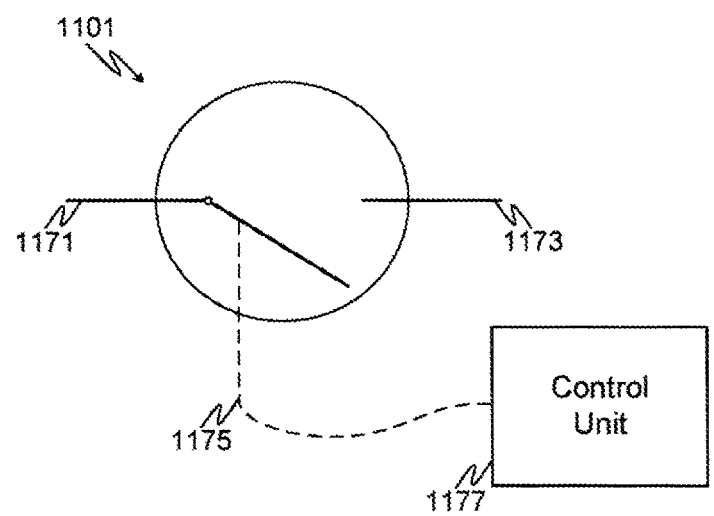
FIG. 11F depicts a relay switch suitable for use with the various embodiments disclosed herein.

FIG. 11F depicts a relay switch 1101 (similar to relay switch 1103) which is suitable for use with the various embodiments disclosed herein. The relay switches 1101-1103 are typically all similar in design. The discussion above mentions relay switches 1101 (plural) and relay switches 1103. In FIGS. 11A-F only one relay switch is labeled 1101 and only one relay switch is labeled 1103. However, the relay switch immediately next to the switch labeled 1101 is also considered a relay switch 1101 since both relay switches on the two wires of a twisted pair are typically opened/closed simultaneously. Similarly, the relay switch on the other wire of the twisted pair connected to relay switch 1103 is also considered a relay switch 1103 for the purposes of this discussion.

Turning to FIG. 11F, the relay switch 1101 has a terminal 1171 which is typically coupled to the network switch 1041. The terminal 1171 is generally not connected directly to the network switch 1041, but rather, it is coupled to it inasmuch as it is connected to network switch 1041 via one or more other components or cable connectors. Similarly, the relay switch 1101 has a terminal 1173 which is typically coupled to an active component such as wireless node 1033. The terminal 1173 is generally not connected directly to the wireless node 1033, but rather, it is coupled to it inasmuch as it is connected to wireless node 1033 via one or more other components or cable connectors, e.g., via cable conductors 1031 and IoT outlets 1004.

The relay switch 1101 typically has a control line 1175 through which control signals can be sent to open or close the relay switch 1101. In some implementations the control signals may be sent via terminal 1171 or 1173, and in such instances the control line is considered to be the terminal that receives the control signals rather than a separate control line 1175. The control signals come from a control unit 1177. The control unit 1177 (or control device, or control means) may be implemented using a number of various structures including for example, a computer, a smart phone, a dedicated circuit assembly, or any other logic device or type of controller known to those of ordinary skill in the art. The relay switches 1101-1103 are typically located within an IoT panel or patch panel 1001, but may in some implementations be located in other parts of the cable network system so long as they are within the path of the current circuits diagrammed in FIGS. 11A-E.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module," "logic" or "system." Furthermore, aspects of the various embodiments may take the form of a computer program product embodied in one or more computer readable medium(s) having computer readable program code stored thereon.

Any combination of one or more computer readable medium(s) may be utilized. The computer readable medium is typically a non-transitory computer readable storage medium. Such a non-transitory computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations and aspects of the various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus, systems, and computer program products according to various embodiments disclosed herein. It will be understood that one or more blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, a programmable data processing apparatus, or other such devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Various embodiments disclosed herein are drawn to a LAN cable monitoring system. The system may also be called a cable conductor monitoring system, or may be called a communication cable monitoring system, or may be called a LAN cable conductor energy measurement, monitoring and management system. A PoE system typically uses RJ45 connectors. It is understood, however, that the various embodiments may use, or be used with, any number of different types of networks based on various standards known to those of ordinary skill in the art. A "network switch" as this term is used herein is a computer networking device that connects devices together on a computer network, for example, by using packet switching to receive, process, and forward data to the destination device. A network switch may also be called a switching hub, a bridging hub or a MAC bridge. An embodiment of the IoT outlet is disclosed as being Ethernet wall plate RJ45 socket outlet. The IoT outlet may be embodied as other like types of outlets conforming to various other electronics and/or connector standards known to those of ordinary skill in the art. A temperature sensor positioned either directly on (e.g., fastened to) or in physical contact with a cable conductor (or the outside insulator of a cable conductor line) may be said to measure a temperature of the cable conductor. The term "twisted pair" refers to a twisted pair of wires configured to carry communication signals, for example, a twisted pair of wires in an ethernet cable.

The term "relay switch" (or simply "relay"), as it is used herein, means a switch that is remotely controllable with an electric signal. A control signal is used to open (or close) the relay switch. Either NO (normally open) or NC (normally closed), or a combination of both, may be used as relay switches in the various embodiments. Any type of switch that can be opened/closed (turned ON/OFF) with an electric signal may be considered a "relay switch" as this term is used herein. The relay switches discussed herein are typically controlled in pairs, with one relay switch on each conductor wire of a twisted pair conductor. The relay switch pairs may be controlled individually in unison, or may be controlled in tandem in order to open/close both wires of the twisted pair simultaneously (or within less than 10 milliseconds of each other). The discussion above centers around embodiments with relay switches contained in a patch panel. However, in at least some embodiments the relay switches may be located in the circuit path at points other than within the patch panel. For example, one or more relay switches may be positioned outside the patch panel, either towards the network switch or at any point towards the system component (away from the network switch) including on the IoT plug itself.

An "active component device" is a system component with a MAC address (or other like type of identifying address intended to be specific to that component) that receives and/or transmits information in the cable network system. Examples of active component devices include laptop, desktop and tablet computers, smart phones, mobile phones and other wireless devices, printers, scanners, routers, Wi-Fi nodes and other wireless nodes, and other like types of electronic devices that are known by those of ordinary skill in the art to be connected—either hard-wired or wirelessly—to a cable network system.

A first plurality of items each "respectively connected" to a second plurality of items means that each item in the first plurality of items is connected to one of the items in the second plurality of items. The two components that are "communicatively coupled" as this term is used herein means that the two components are in communication with each other. The components need not have a constant communication connection at all times to be communicatively coupled. For example, two components—e.g., an IoT panel of a temperature sensor—may be communicatively coupled via the Internet. They are considered communicatively coupled even though their Internet access may not afford them constant contact with each other at all times, 24 hours per day. A first tem connected to second item may either be communicatively coupled, or may be hardwired or to provide a constant connection. The IoT panel is illustrated in FIG. 2 and described as being connected to a network switch with a number of cable connectors. However, in some implementations either all or a subset of the IoT panel circuitry or functionality may be enclosed within the network switch itself. Cable conductors are considered to be "bundled together" or in a "bundle" if they are fastened together with a tie strap, tied together, or taped together, or otherwise are positioned in physical contact with each other.

The description of the various embodiments provided above is illustrative in nature inasmuch as it is not intended to limit the invention, its application, or uses. Thus, variations that do not depart from the intents or purposes of the invention are intended to be encompassed by the various embodiments of the present invention. Such variations are not to be regarded as a departure from the intended scope of the present invention.

What is claimed is:

1. An active component validation apparatus for a cable network system including a network end device, the apparatus comprising:

a plurality of relay switches including a first relay switch and a second relay switch, each of the plurality of relay switches being controllable with control signals;

the first relay switch having a first terminal conductively coupled to the network switch, the first relay switch having a second terminal conductively coupled to the network end device via a wire of a twisted pair;

a first control line communicatively coupling the first relay switch to a control unit;

wherein the first relay switch is set to either an open state or to a closed state by first control signals sent by the control unit on the first control line communicatively coupling the first relay switch to the control unit; and wherein upon setting the first relay switch to an open state the active component validation apparatus validates a physical location of the network end device by receiving an indication of a reduction in transmission speed to the network end device from the network switch.

2. The apparatus of claim 1, wherein the indication of the reduction in transmission speed to the network end device validates a physical connection of an IoT panel port to a network switch port.

3. The apparatus of claim 1, wherein the twisted pair is a first twisted pair, the apparatus further comprising:

an ethernet cable comprising up to four twisted pairs including the first twisted pair and a second twisted pair.

4. The apparatus of claim 3, further comprising:

the second relay switch having a third terminal conductively coupled to the network switch, the second relay switch having a fourth terminal conductively coupled to the network end device via a wire of the second twisted pair;

a second control line communicatively coupling the second relay switch to the control unit configured to send second control signals to controllably change the second relay switch to the open state or to a closed state.

5. The apparatus of claim 4, wherein the reduction in transmission speed to the network end device is an initial reduction; and wherein, with the first relay switch set to the open state, upon setting the second relay switch to the open state the active component validation apparatus confirms a further reduction in transmission speed to the network end device.

6. The apparatus of claim 2, wherein the network end device is identified by a MAC address and is coupled to an IoT outlet via a cabling connection; and wherein the IoT outlet location is maintained in a physical component database.

7. The apparatus of claim 6, wherein a correlation of the IoT outlet to the network switch port is validated via a physical connection to an IoT panel port corresponding to the IoT outlet, wherein the physical connection to the IoT panel port is an ethernet jumper cable between the network switch port and the IoT panel port.

8. The apparatus of claim 7, wherein, based on the indication of the reduction in transmission speed, the active component validation apparatus associates in the physical component database a physical location of the network end device identified by the MAC address with the IoT outlet location.

9. A method of active component validation for a cable network system including a network end device, the method comprising:

providing a plurality of relay switches including a first relay switch and a second relay switch, each of the plurality of relay switches being controllable with control signals;

conductively coupling a first terminal of the first relay switch to the network switch;

conductively coupling a second terminal of the first relay switch to the network end device via a wire of a twisted pair;

communicatively coupling the first relay switch via a first control line to a control unit;

sending first control signals from the control unit to controllably set the first relay switch to an open state; and upon setting the first relay switch to the open state, the active component validation apparatus validates a physical location of the network end device by receiving an indication of a reduction in transmission speed to the network end device from the network switch.

10. The method of claim 9, wherein the indication of the reduction in transmission speed to the network end device validates a physical connection of an IoT panel port to a network switch port.

11. The method of claim 9, wherein the twisted pair is a first twisted pair, the method further comprising:

providing an ethernet cable comprising up to four twisted pairs including the first twisted pair and a second twisted pair;

conductively coupling a third terminal of the second relay switch to the network switch;

conductively coupling a fourth terminal of the second relay switch to the network end device via a wire of the second twisted pair;

communicatively coupling the second relay switch via a second control line to the control unit;

sending second control signals from the control unit to controllably set the second relay switch to the open state.

12. The method of claim 11, wherein the reduction in transmission speed to the network end device is an initial reduction; and wherein, with the first relay switch set to the open state, upon setting the second relay switch to the open state the active component validation apparatus confirms a further reduction in transmission speed to the network end device.

13. The method of claim 9, wherein the network end device is identified by a MAC address and is coupled to an IoT outlet via a cabling connection; and wherein the IoT outlet location is maintained in a physical component database.

14. The method of claim 13, wherein a correlation of the IoT outlet to the network switch port is validated via a physical connection to an IoT panel port corresponding to the IoT outlet, wherein the physical connection to the IoT panel port is an ethernet jumper cable between the network switch port and the IoT panel port.

15. The method of claim 14, further comprising:

based on the indication of the reduction in transmission speed, the active component validation apparatus associates in the physical component database a physical location of the network end device identified by the MAC address with the IoT outlet location.

* * * * *